(12) United States Patent
Haake et al.

(10) Patent No.: US 11,493,122 B2
(45) Date of Patent: Nov. 8, 2022

(54) PLANETARY GEARING WITH IMPROVED LUBRICANT SUPPLY, DRIVE TRAIN AND WIND TURBINE

(71) Applicant: Flender GmbH, Bocholt (DE)

(72) Inventors: Norbert Haake, Dorsten (DE); Volker Lensing, Rhede (DE)

(73) Assignee: FLENDER GMBH, Bocholt (DE)

( * ) Notice: Subject to any disclaimer, the term of this patent is extended or adjusted under 35 U.S.C. 154(b) by 127 days.

(21) Appl. No.: 17/033,171

(22) Filed: Sep. 25, 2020

(65) Prior Publication Data

US 2021/0095755 A1 Apr. 1, 2021

(30) Foreign Application Priority Data

Sep. 27, 2019 (EP) ..................... 19200060

(51) Int. Cl.
*F03D 15/00* (2016.01)
*F16H 57/04* (2010.01)
*F03D 80/70* (2016.01)
*F16H 1/46* (2006.01)

(52) U.S. Cl.
CPC ......... *F16H 57/0423* (2013.01); *F03D 15/00* (2016.05); *F03D 80/70* (2016.05); *F16H 1/46* (2013.01); *F16H 57/0486* (2013.01); *F05B 2260/40311* (2013.01)

(58) Field of Classification Search
CPC ............ F16H 57/0423; F16H 57/0421; F16H 57/042; F16H 57/0486; F16H 1/46; F16H 57/04; F03D 15/00; F03D 80/70; F05B 2260/40311
See application file for complete search history.

(56) References Cited

U.S. PATENT DOCUMENTS

| 4,271,928 A | 6/1981 | Northern | |
|---|---|---|---|
| 10,066,735 B1 * | 9/2018 | Martin | F16C 35/02 |
| 2010/0007151 A1 * | 1/2010 | Ciszak | F16H 57/043 184/6.12 |
| 2018/0340606 A1 * | 11/2018 | Deitmers | F16H 57/0479 |
| 2019/0203768 A1 * | 7/2019 | Meyer | F16C 33/1055 |
| 2020/0224642 A1 * | 7/2020 | Yang | F16H 57/082 |

FOREIGN PATENT DOCUMENTS

| DE | 10 2010 031 181 A1 | 1/2012 | |
|---|---|---|---|
| DE | 10 2010 060 147 A1 | 1/2012 | |
| DE | 102010060147 A1 * | 4/2012 | F03D 15/00 |
| DE | 102010060147 A1 | 4/2012 | |
| DE | 10 2015 223 669 A1 | 6/2017 | |
| DE | 10 2018 120 930 A1 | 6/2019 | |
| EP | 2 597 307 B1 | 2/2018 | |
| EP | 3 58 863 A1 | 1/2020 | |
| WO | WO 2010-005790 A2 | 1/2010 | |
| WO | WO 2013-021181 A1 | 2/2013 | |
| WO | WO 2020-001942 A1 | 1/2020 | |

* cited by examiner

*Primary Examiner* — Brian P Wolcott
*Assistant Examiner* — Joshua R Beebe
(74) *Attorney, Agent, or Firm* — Henry M. Feiereisen LLC

(57) ABSTRACT

A planetary gearing includes at least a first planetary stage and a second planetary stage and a double-walled pipe. The double-walled pipe has an inner pipe and an outer pipe and is provided with an outlet point in a central section. A bushing is arranged on the outlet point.

14 Claims, 6 Drawing Sheets

PLANETARY GEARING WITH IMPROVED LUBRICANT SUPPLY, DRIVE TRAIN AND WIND TURBINE

CROSS-REFERENCES TO RELATED APPLICATIONS

This application claims the priority of European Patent Application, Serial No. EP19200060.2, filed Sep. 27, 2019, pursuant to 35 U.S.C. 119(a)-(d), the disclosure of which is incorporated herein by reference in its entirety as if fully set forth herein.

BACKGROUND OF THE INVENTION

The present invention relates to a planetary gearing with an improved lubricant supply, to a drive train with a corresponding planetary gearing, and to a wind turbine equipped with a drive train of this kind.

The following discussion of related art is provided to assist the reader in understanding the advantages of the invention, and is not to be construed as an admission that this related art is prior art to this invention.

Planetary gearings are used in a multiplicity of technical fields in which increasing demands are made with respect to performance, reliability, service life and economic efficiency. It is further desirable inter alia to have efficient lubricant utilization. This applies in particular to planetary gearings in wind turbines.

It would be desirable and advantageous to provide an improved planetary gearing to obviate prior art shortcomings.

SUMMARY OF THE INVENTION

According to one aspect of the present invention, a planetary gearing includes a first planetary stage, a second planetary stage operably connected to the first planetary stage, a double-walled pipe sized to extend through the first and second planetary stages and, the double-walled pipe including an inner pipe, an outer pipe in surrounding relation to the inner pipe, a central section, and an outlet point embodied in the central section for output of lubricant, and a bushing arranged on the outlet point and configured to guide the lubricant output from the outlet point.

In accordance with the present invention, the first and second planetary stages are connected in series. The double-walled pipe can be attached in a region of a main axis of rotation of the planetary gearing. The inner pipe and the outer pipe form an annular channel for passage of a lubricant is formed. The inner pipe can, for example, be embodied as a pitch pipe through which lines can be guided through the planetary gearing. Viewed along the main axis of rotation, the double-walled pipe has, in the central section, the outlet point embodied to output lubricant from the double-walled pipe into a gearing component. The bushing arranged on the outlet point can be embodied as a single part or a plurality of parts. A multi-part bushing can, for example, include two axially spaced apart annular bushings. Hence, the lubricant passes through the bushing when delivered to the gearing component. The bushing enables low-leakage, virtually leakage-free, transfer of the lubricant to the gearing component. Here, a bushing can be manufactured as particularly long-lasting, leakage-inhibiting and in an economical manner. This enables increased lubricant throughput, which can, for example, be ensured by increased feed pressure in the lubricant. Thus, the leakage-inhibiting effect of the bushing minimizes any lubricant loss that occurs in this way and is hence still technically acceptable. As a result of this, improved lubrication and/or cooling can be achieved for gearing components, for example for planetary gear friction bearings or spray lubrication of gear teeth. This in turn allows the planetary gearing to be exposed to an increased operational load. Hence, the bushing according to the invention serves to improve the performance of the planetary gearing according to the invention. The actual bushing has a relatively small outer diameter and hence allows economical use of suitable materials, such as, for example, bronze, Teflon-coated materials or sintered metals from which the bushing can be produced.

According to another advantageous feature of the present invention, the bushing and the double-walled pipe can be arranged to define a gap in fluid communication with the outlet point to allow leakage of lubricant. During operation, lubricant enters the gap so that there is no direct contact between the outer pipe of the double-walled pipe and the bushing. The gap has a minimized gap height, i.e. radial dimension. The gap height can be 0.1 mm to 0.5 mm, in particular 0.25 mm to 0.35 mm. Herein, the gap height is the gap height obtained during operation as intended of the planetary gearing taking into account the thermal expansion of the bushing. The minimized gap height reduces lubricant loss at the gap. Due to the fact that the bushing has a relatively small outer diameter, the tolerances to be observed in order to achieve a minimized gap have a more favorable ratio to the overall dimensions, in particular to the outer diameter of the bushing. This permits cost-efficient production of the bushing.

According to another advantageous feature of the present invention, provision may be made for a guide bearing arranged in a region of the outlet point and configured to adjust the gap. The guide bearing, e.g. a rolling-contact bearing or friction bearing, can be positioned such that it is supported against a same gearing component as the bushing. For this purpose, the bearing can be positioned adjacent to the bushing. In particular, the bushing and the guide bearing can be arranged on an inner side of a hub of a planetary carrier of the second planetary stage. Such guide bearings are readily available in a multiplicity of sizes and offer a high degree of alignment precision for the double-walled pipe, in particular for the outer pipe thereof. At the same time, relative to the main axis of rotation, such a guide bearing permits relative rotation between the double-wailed pipe and the corresponding gearing component. Under changing operating conditions of the planetary gearing, displacement may occur in the region of the central section of the double-walled pipe, in particular in the radial direction. This can interfere with the gap between the bushing and the double-walled pipe. In particular, the gap can be narrowed on one side and radially expanded on an opposite side, which in turn results in increased lubricant loss. The closer the axial arrangement of the guide bearing on the bushing, the more effectively displacement that results in interference with the gap can be avoided. This permits the load-bearing capacity of the claimed planetary gearing to be increased in a simple manner.

According to another advantageous feature of the present invention, the first planetary stage can include at least five planetary gears, preferably five to twelve, further preferably seven to ten planetary gears, and/or the second planetary stage can include at least four planetary gears, preferably six or seven, planetary gears. Herein, the planetary gears can further in each case be arranged rotatably in the respective planetary carrier on friction bearings or rolling-contact bearings in each case. The more planetary gears that are arranged in a planetary carrier, the greater the amount of lubricant required in the corresponding planetary stage. Hence, the use of a bushing on the outlet point in the central region of the double-walled pipe permits the minimization of lubricant losses when there is an increased throughput of lubricant. In particular, this can produce an increase in the throughput of lubricant without increasing the feed pressure. The feed pressure is substantially limited in that excessive feed pressure can result in foaming, for example on fan nozzles. This enables a power-density-increasing configuration with an increased number of planetary gears in the individual planetary stages. Reference is made in this context to EP 3587863, the entire specification and drawings of which are expressly incorporated herein by reference.

According to another advantageous feature of the present invention, the second planetary stage can include a planetary carrier which includes a baseplate connected to the bushing, with the bushing having a width which corresponds to a wall thickness of the baseplate of the planetary carrier. Herein, the width of the bushing in the assembled state should be understood to be the axial dimension thereof, i.e. along the main axis of rotation. The bushing is arranged within the planetary gearing where there is corresponding installation space in the axial direction, which permits an increased bushing width. For example, a correspondingly dimensioned baseplate can be embodied on the inner side of a hub of the planetary carrier of the second planetary stage. Herein, the baseplate can also be embodied in one piece with the planetary carrier of the second planetary stage. The greater the width of the bushing, the greater the leakage-inhibiting effect of the gap between the bushing and the double-walled pipe and the lower the lubricant losses. Thus, the provision of installation space is made possible for a wide bushing in a structurally simple manner and as a result lubricant losses can be minimized. Bushings of different widths can be produced in a simple and economical manner with a relatively high degree of precision. Hence, further advantages are realized in a simple and cost-efficient manner.

According to another advantageous feature of the present invention, provision may be made for a third planetary stage, with the second planetary stage being arranged between the first and third planetary stages. As a result, a reliable, low-leakage and simultaneously efficient lubricant supply for planetary stages arranged in an axial inner region of a planetary gearing can be realized. Due to the fact that a bushing is used which has no direct contact with the double-walled pipe, there is also no technically relevant wear requiring frequent inspections of the outlet point. Therefore, a planetary gearing according to the present invention can have three or more planetary stages or further spur gear stages through which the second planetary stage or one lying even further inside can only be accessed with difficulty. This enables complex planetary gearing with an increased number of planetary stages to be produced in a technically practicable manner and operated economically.

According to another advantageous feature of the present invention, the double-walled pipe can be configured to enable dismantling thereof without destruction. For this, the outer pipe and/or the inner pipe can be fastened with seals on a baseplate of a planetary carrier of the first planetary stage. As an alternative or in addition, the outer pipe and/or the inner pipe can be connected to one another on a lid, for example a housing lid. In addition, the outer pipe and/or inner pipe can be embodied axially separated. Accordingly, the outer pipe or the inner pipe is put together during assembly. This can be implemented via a non-rotatable connection, in a positive fitting manner or via a further torque-transmitting component, for example a feather key or a pin or via a non-positive connection, for example on a cone shrink fit or cylinder shrink fit. The reduced axial dimensions of the corresponding components of the outer pipe or the inner pipe simplify handling thereof during maintenance or repair work. This in particular simplifies maintenance work in a nacelle of a wind turbine.

According to another advantageous feature of the present invention, provision may be made for a bearing configured to accommodate axial and radial forces, with the planetary carrier of the second planetary stage being accommodated in the bearing. Such a bearing can, for example, be embodied as an axial spherical roller bearing or as a tapered roller bearing. Such a bearing permits the minimization or avoidance of movements of the planetary carrier in the second planetary stage that would interfere with the gap on the bushing. At the same time, such a bearing offers a high load-bearing capacity and permits the installation position of the planetary carrier of the second planetary stage to be set precisely. This implements the above-described advantages of the invention to a special extent.

According to another advantageous feature of the present invention, provision may be made for a further outlet point arranged in a region of a first end of the double-walled pipe. The outlet point at the first end of the double-walled pipe is embodied to supply the first planetary stage with lubricant, for example planetary gears, which are accommodated rotatably on friction bearings or rolling-contact bearings in the planetary carrier, gear teeth in the first planetary stage, and/or bearings in which the planetary carrier is mounted. For this purpose, the outer pipe and/or inner pipe of the double-walled pipe can be connected non-rotatably to the planetary carrier of the first planetary stage. Alternatively, the double-walled pipe can also be fastened non-rotatably to any other rotating or stationary gearing component. A further option involves configuring the double-walled pipe loosely rotatably in the planetary gearing. As a result, there is no relative rotation between the planetary carrier of the first planetary stage and the double-walled pipe. Accordingly, the outlet point can be sealed at the first end by means of sealing washers. Consequently, the sealing washers are static during operation and hence provide a simple possibility for suitable sealing. In particular, static sealing washers are subject to virtually no wear and are substantially only subject to ageing. This enables the outlet point to be operated more reliably at the first end with simple means.

According to another advantageous feature of the present invention, provision may be made for a feed bushing arranged on a second end of the double-walled pipe. Herein, the second end can lie on an end of the double-walled pipe facing away from the first planetary stage. Further, a co-rotating lid can be attached on the second end. The feed bushing causes an inflow of lubricant, which is fed in via the outlet points in the central section possibly at the first end to the planetary gearing. Herein, according to one of the embodiments of the bushing, the feed bushing can be embodied on the outlet point in the central section. The feed bushing is arranged between the outer pipe and housing wall or housing lid of the planetary gearing, wherein a feed bore for the lubricant is embodied in the housing wall or the housing lid. In particular, a gap can be embodied between the feed bushing and the double-walled pipe. Accordingly, in this way a reliable and low-leakage lubricant feed for the double-walled pipe is implemented.

According to another aspect of the present invention, a drive train for a wind turbine includes a generator, a planetary gearing connected in a torque-transmitting manner to the generator and including a first planetary stage, a second planetary stage operably connected to the first planetary stage, a double-wailed pipe sized to extend through the first and second planetary stages, the double-walled pipe including an inner pipe, an outer pipe in surrounding relation to the inner pipe, a central section, and an outlet point embodied in the central section for output of lubricant, and a bushing arranged on the outlet point and configured to guide the lubricant output from the outlet point, and a rotor shaft connected in a torque-transmitting manner to the planetary gearing.

The rotor shaft can be connected to a rotor of a wind turbine. As the rotor shaft is coupled in a torque-transmitting manner to the planetary gearing, which is in turn connected in a torque-transmitting manner to a generator, a rotation of the rotor can be converted into a rotation of the generator and electricity can be generated. The drive train can be accommodated in a nacelle of the wind turbine.

According to still another aspect of the present invention, a wind turbine includes a nacelle including a drive train as set forth above, and a rotor attached rotatably on the nacelle. The nacelle accommodates the drive train, which is connected to the rotor in a torque-transmitting manner.

According to yet another aspect of the present invention, an industrial application includes a drive unit, an output unit, and a planetary gearing connecting the drive unit and the output unit to one another in a torque-transmitting manner, the planetary gearing including a first planetary stage which includes an input shaft connected to the drive unit, a second planetary stage operably connected to the first planetary stage, a double-walled pipe connected to the input shaft and sized to extend through the first and second planetary stages, the double-walled pipe including an inner pipe, an outer pipe in surrounding relation to the inner pipe, a central section, and an outlet point embodied in the central section for output of lubricant, and a bushing arranged on the outlet point and configured to guide the lubricant output from the outlet point.

The drive unit can, for example, be embodied as an electric motor, an internal combustion engine or a hydraulic motor. The drive unit provides a drive power that is fed to the planetary gearing. For this purpose, the drive unit is connected to the planetary gearing in a torque-transmitting manner. The planetary gearing is in turn connected in a torque-transmitting manner to the output unit to which the drive power is provided with a changed speed and taking into account mechanical losses. The output unit can be embodied as a mechanical application so that the industrial application overall is, for example, a mill, vertical mill, sugar mill, cement mill, rock crusher, conveyer belt, pump, roller press, apron conveyor, tube mill, rotary kiln, sleeving gear, agitator, lifting device, waste compactor or scrap baling press.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
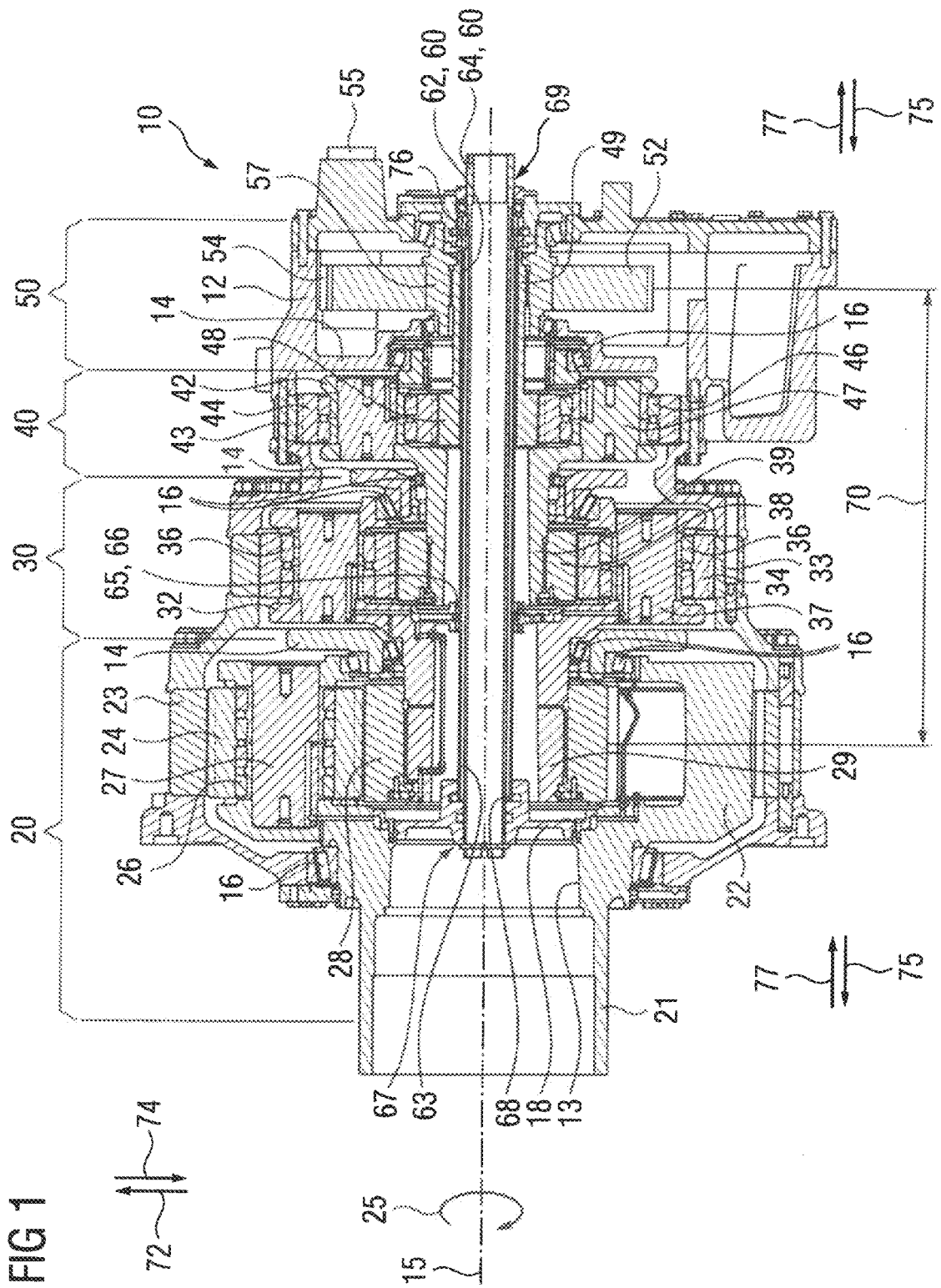
FIG. 1 is a schematic longitudinal section of a first embodiment of a planetary gearing according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic longitudinal section of a first embodiment of a planetary gearing according to the present invention, generally designated by reference numeral 10. The planetary gearing 10 includes a first planetary stage 20, a second planetary stage 30 and third planetary stage 40 which are connected in series. A spur gear stage 50 is connected downstream of the third planetary stage 40. The first planetary stage 20 has an input shaft 21 that can be rotated about a main axis of rotation 15 and via which drive power, indicated by arrow 25, can be fed. The input shaft 21 is embodied in one piece with a planetary carrier 22 of the first planetary stage 20. In the planetary carrier 22 of the first planetary stage 20 is mounted rotatably by means of land bearings 16, which are embodied as rolling-contact bearings, on a housing 12 or a housing wall 14 of the planetary gearing 10. Further, a multiplicity of planetary gear bolts 27, on which in turn in each case a rolling-contact bearing 26 is arranged, are attached releasably in the planetary carrier 22 of the first planetary stage 20. In turn, planetary gears 24, which mesh with a hollow gear 23 of the first planetary stage 20 are arranged on the rolling-contact bearings 26. At least five planetary gears 24, preferably seven to ten planetary gears 24, are arranged in the planetary carrier 22 of the first planetary stage 20. The planetary gears 24 also mesh with a sun gear 28 of the first planetary stage 20, which is in turn connected to a sun shaft 29.

The sun shaft 29 of the first planetary stage 20 is embodied in one piece with a planetary carrier 32 of the second planetary stage 30 and thus coupled in a torque-transmitting manner. Like the planetary carrier 22 of the first planetary stage 20, the planetary carrier 32 of the second planetary stage 30 has a plurality of releasable planetary gear bolts 37, on which in each case a rolling-contact bearing 36 is arranged. The planetary carrier 32 of the second planetary stage 30 is accommodated rotatably on both sides in land bearings 16 on housing walls 14 of the planetary gearing 10. In each case, a planetary gear 34 is positioned on the rolling-contact bearings 36 of the second planetary stage 30. Herein, at least four, preferably five or six, planetary gears 34 are arranged in the second planetary stage 20. The planetary gears 34 mesh with a hollow gear 33 and with a sun gear 38 of the second planetary stage 30.

The sun gear 38 of the second planetary stage 30 is connected to a sun shaft 39, which is in turn embodied in one piece with a planetary carrier 42 of the third planetary stage 40. The structure of the third planetary stage 40 is substantially the same as the first and second planetary stage 20, 30. The planetary carrier 42 of the third planetary stage 40 is accommodated rotatably on both sides in land bearings 16, which are arranged on housing walls 14. A multiplicity of planetary gear bolts 47 on which in turn in each case a rolling-contact bearing 46 is attached is accommodated releasably in the planetary carrier 42 of the third planetary stage 40. Planetary gears 44, which mesh with a hollow gear 43 and a sun gear 48 of the third planetary stage 40, are in turn rotatably arranged on the rolling-contact bearings 46 in the third planetary stage 40. The sun gear 43 is in turn embodied in one piece with a sun shaft 49 of the third planetary stage 40 that establishes a connection with a spur gear stage 50.

The spur gear stage 50 includes a first spur gear 52, which is arranged in a torque-transmitting manner on a hollow shaft, which is in turn connected in a torque-transmitting manner to the sun shaft 49 of the third planetary stage 40. The first spur gear 52 meshes with a second spur gear 54, which also belongs to the spur gear stage 50 and is in turn connected to an output shaft 55 in a torque-transmitting manner. The drive power introduced at the input shaft 21 with a changed speed, taking into account mechanical losses in the planetary gearing 10, is output via the output shaft 55.

A double-walled pipe 60 that substantially extends through the planetary gearing 10 is arranged in the planetary gearing 10 in the region of the main axis of rotation 15. The double-wailed pipe 60 includes an outer pipe 62 that encloses an inner pipe 64. As a result, an annular channel 63 is embodied between the outer and the inner pipe 62, 64 through which a lubricant is fed during operation as intended of the planetary gearing 10. The inner pipe 64 is embodied as a pitch pipe, which is suitable for guiding electric lines, data lines, pipes and hoses that are not shown in any further detail. An outlet point 65 is embodied in a central section 70 of the double-walled pipe 60 that is located along the main axis of rotation 15 at least in the region of the second planetary stage 30. The outlet point 65 in the central section 70 is substantially embodied as an opening in the outer pipe 62 through which lubricant can be output to the second planetary stage 30. A bushing 66 through which the lubricant emerging from the outlet point 65 is guided into the second planetary stage 30 is arranged on the outlet point 65 in the central section 70. This lubricant serves inter alia for the lubricant supply to the rolling-contact bearing 36 in the second planetary stage 30.

At a first end 67, which is in the region of the first planetary stage 20, the double-walled pipe 60 is further connected non-rotatably with a lid 18, which is arranged on an inner side 13 of the input shaft 21. As a result of this, there is no relative rotation between the outer pipe 62 and the inner pipe 64 during operation as intended of the planetary gearing 10. In operation, the double-walled pipe 60 follows a rotation of the input shaft 21. The inner pipe 64 protrudes beyond the outer pipe 62 in the region of the first end 67 in an axial outer direction. In FIG. 1, an axial outer direction is symbolized by arrows 75, an axial inner direction by arrows 77. In FIG. 1, a radial outer direction is symbolized by arrow 72, a radial inner direction by arrow 74. A further outlet opening 68 through which the first planetary stage 10 can be supplied with lubricant is embodied in the region of the first end 67. Moreover, a feed bushing 76 via which the lubricant can be introduced into the annular channel 63 is arranged on a second end 69 in the housing 12.

Figure 2:
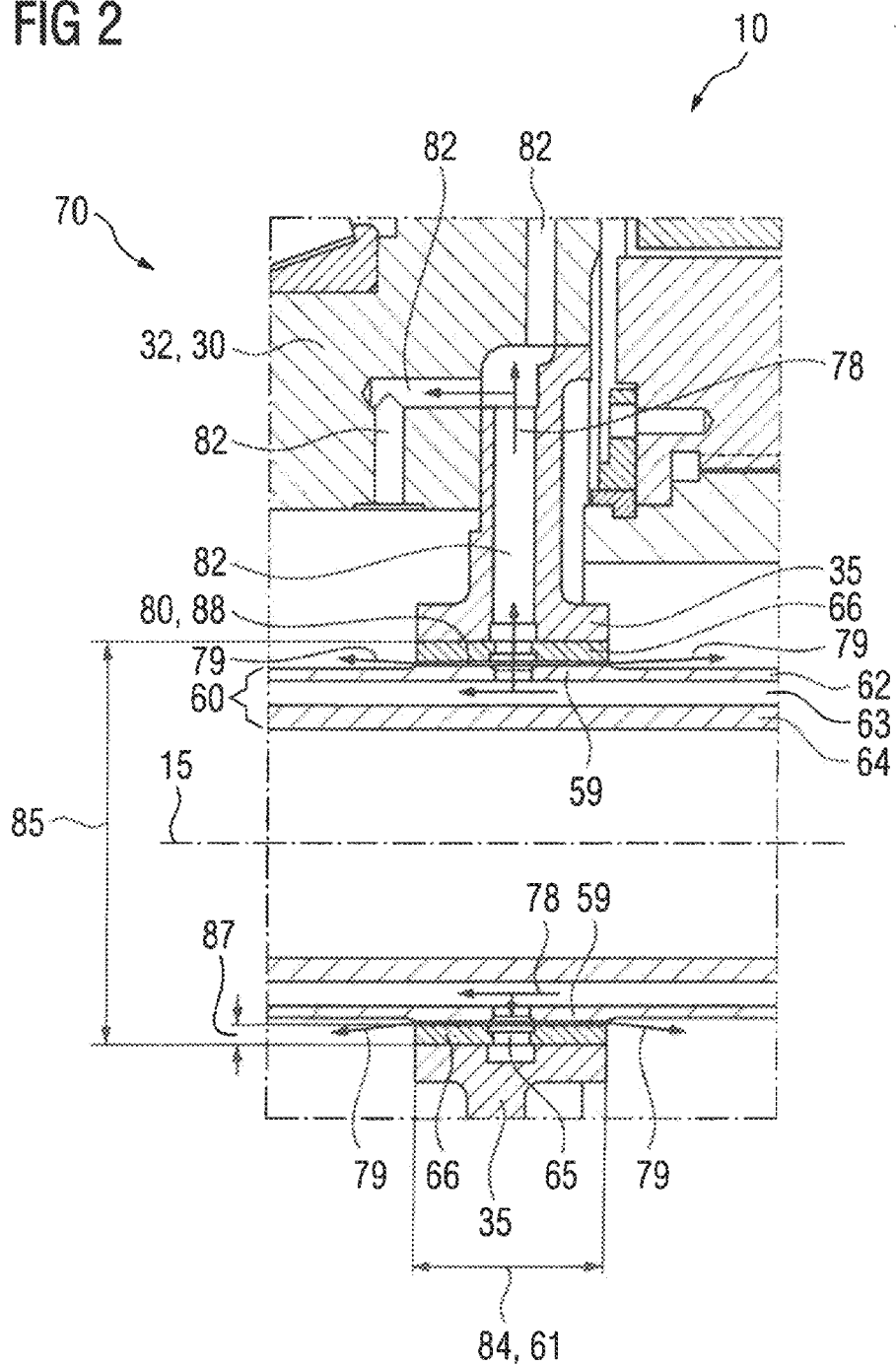
FIG. 2 is an enlarged detailed sectional view of the planetary gearing of FIG. 1 in a region of an outlet point in a central section of the planetary gearing.

FIG. 2 is a schematic detail view from the central section 70 in accordance with FIG. 1 in longitudinal section. In detail, FIG. 2 shows the double-walled pipe 60, which includes the outer pipe 62 which encloses the inner pipe 64 and thus forms the annular channel 63 for lubricant. A bushing 66, which is, for example, made of bronze, and is connected to a baseplate 35, which is in turn connected to the planetary carrier 32 of the second planetary stage 30, is arranged on the outlet point 65. A lubricant channel 82 through which lubricant can be forwarded to further lubricant channels 82 in the planetary carrier 32 of the second planetary stage 30 is embodied in the baseplate 35. A lubricant flow that occurs during operation as intended is depicted with arrows 78 in FIG. 2. A gap 80 through which lubricant can emerge as leakage loss indicated by arrows 79 is embodied between the bushing 66 and the outer pipe 62. In the radial direction, the gap 80 has a gap height, which can inter alia be set by a thickening 59 on the outer pipe 62 and a wall thickness 87 of the bushing 66. The smaller the gap height 88, the lower the leakage losses 79. The bushing 66 also has a width 61, which substantially corresponds to a gap width 84. The higher the gap width 84, the lower the leakage losses 79. Due to the fact that lubricant is present in the gap 80 during operation as intended, the bushing 66 does not have any direct mechanical contact with the outer pipe 62 so that the outlet point 65 is substantially free of wear. Accordingly, the bushing 66 has a reduced wall thickness 87, which in turn enables savings on material.

In order to ensure a high gap width 84, radially inwards, the baseplate 35 is substantially embodied as a hub. The bushing 66 substantially extends over the width of the hub by means of which, together with the width 61 of the bushing 66, the gap width 84 is defined. With respect to the gap height 88 and gap width 84, the outlet point 65 is embodied in the central section 70 such that the leakage losses 79 of lubricant are minimized. Since the bushing 66 is embodied in the interior of the planetary gearing 10, there is a correspondingly large amount of installation space in the axial direction enabling the installation of a bushing 66 with an increased width 61. Accordingly, the outlet point 65 can be produced in a simple manner with minimized leakage losses 79. Overall, the bushing 66, and hence the outlet point 65, can be designed in a structurally simple manner for minimal leakage losses 79, which in turn enables increased feed pressure in the annular channel 63. This offers the possibility, with reduced leakage losses 79, of supplying lubricant to the second planetary stage 30, which has an increased number of planetary gears 34, i.e. at least four, preferably five or six planetary gears 34. Moreover, the bushing 66 has a relatively small outer diameter 85, which in turn enables the bushing 66 to be produced with a reduced amount of material. Therefore, the reduced usage of materials enables the economical use of even cost-intensive, high-performance materials for the bushing 66, for example Teflon-coated or sintered metals. Moreover, the structure in accordance with FIG. 2 also enables axial displacements of the double-walled pipe 60 on the bushing 66 without additional leakage losses 79 to be accommodated or compensated.

Figure 3:
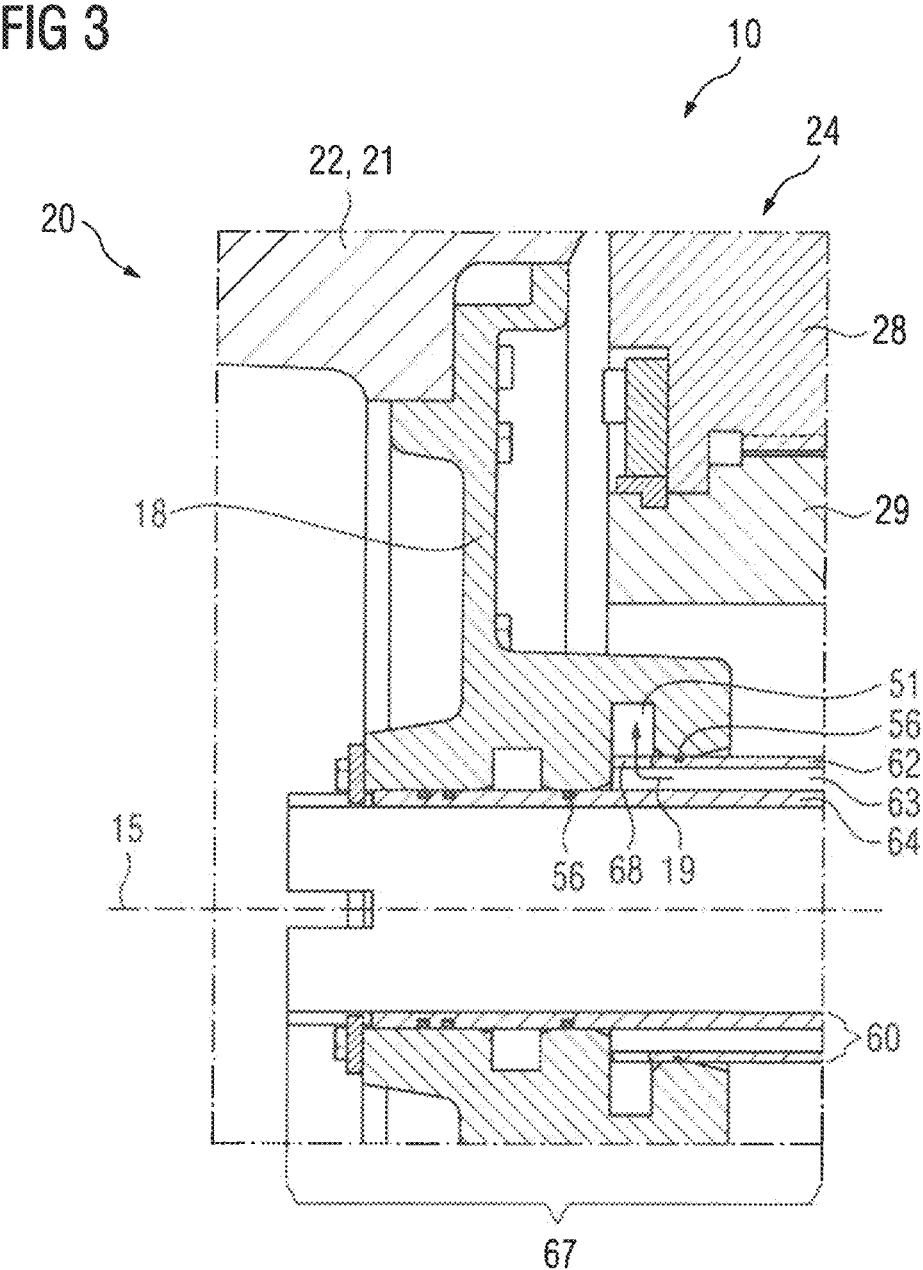
FIG. 3 is an enlarged detailed sectional view of the planetary gearing of FIG. 1 in a region of another outlet point at one end of the planetary gearing.

FIG. 3 is a schematic depiction of a further outlet point 68 in the region of the first end 67 of the double-walled pipe 60 of the planetary gearing 10 in accordance with FIG. 1. The inner pipe 64 protrudes over the outer pipe 62 along the main axis of rotation 15 and is non-rotatably connected to the lid 18. The outer pipe 62 is also non-rotatably connected to the lid 18 or the inner pipe 64 so that, on rotation of the input shaft 21 or of the planetary carrier 22 of the first planetary stage 20 about the main axis of rotation 15, there is no relative rotation between the outer and the inner pipe 62, 64. The annular channel 63 between the outer pipe 62 and the inner pipe 64 is sealed by means of sealing rings 56. The sealing rings 56 are arranged in grooves on the inner pipe 64 or the outer pipe 62. Due to the fact that there is no relative rotation between the outer and inner pipes 62, 64, the sealing rings 56 are only subject to static pressure, which is substantially wear-free. Accordingly, at the further outlet point 68 in the region of the first end 67, it is reliably possible to supply the first planetary stage 20 with lubricant as indicated by arrow 19. For this purpose, the lid 18 is provided with a circumferential lubricant groove 51. The first planetary stage 20 has at least five, preferably seven to ten planetary gears 24, which are not depicted in any further detail in FIG. 3, thus enabling, for sufficient supply with lubricant 19, an increased feed pressure, an annular channel 63 with an increased cross section and/or an increased flow cross section at the outlet point 65. Since the sealing rings 56 are substantially only subject to static pressure, these offer a sufficient reserve with respect to the sealing effect in order, for example, to withstand increased feed pressure permanently and ensure a low-loss to loss-free lubricant supply. This overall ensures a simple and simultaneously reliable supply of lubricant to the first planetary stage 20. As a result, it is in turn possible for the first planetary stage 20, which, due to the increased number of planetary gears 24, has an increased power density, to be implemented in a practicable manner with low to no leakage losses.

Figure 4:
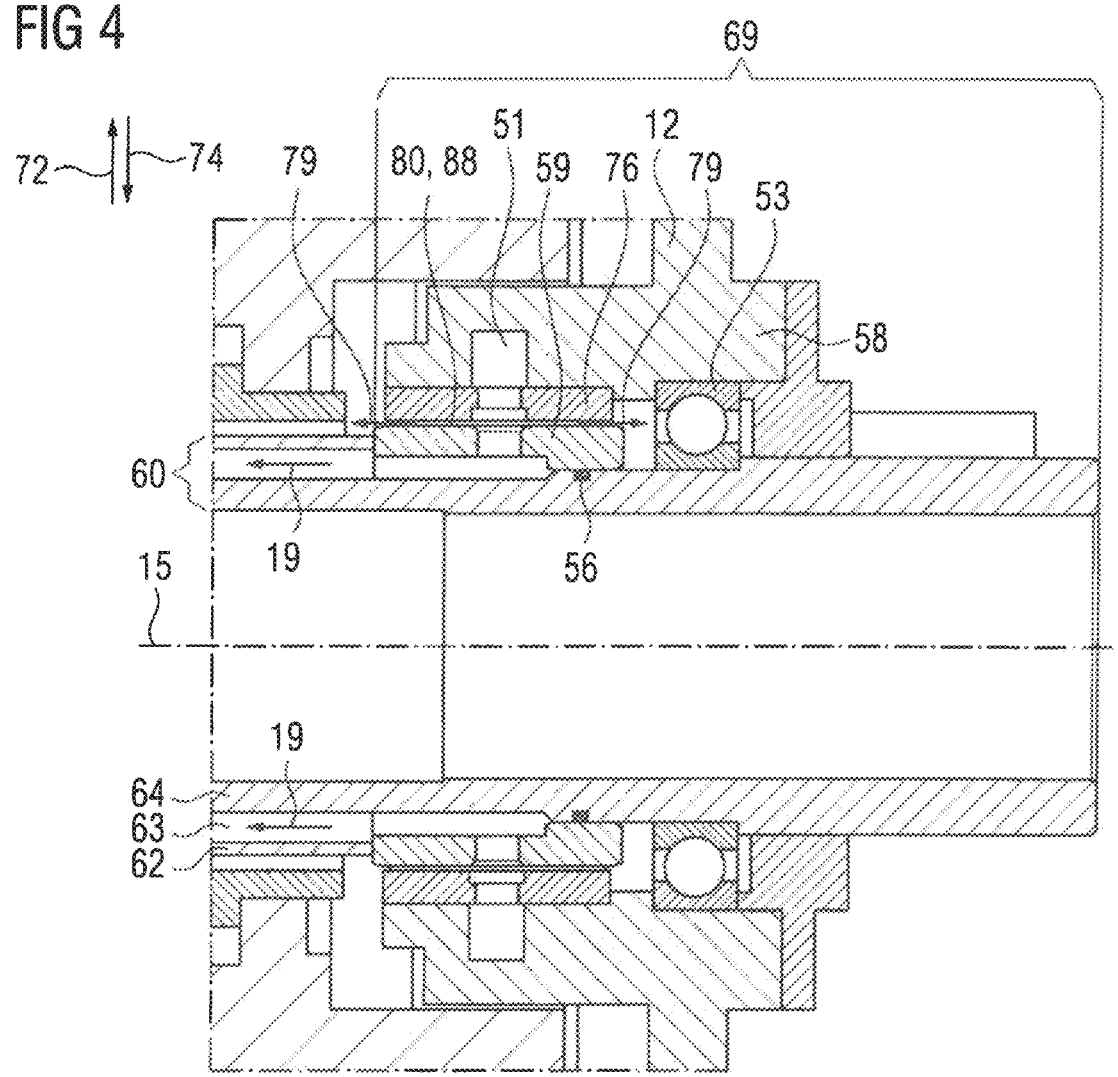
FIG. 4 is an enlarged detailed sectional view of the planetary gearing of FIG. 1 in a region of a feed bushing of the planetary gearing.

A detail view of a feed bushing 76 at the second end 69 of the double-walled pipe 60, as used in the planetary gearing 10 in FIG. 1, is depicted in FIG. 4 in longitudinal section. Lubricant is fed to the feed bushing 76 via a circumferential lubricant groove 51. The feed bushing 76 is arranged non-rotatably on the housing 12 or a housing lid of the planetary gearing 10 so that, on a rotation of the double-walled pipe 60 about the main axis of rotation 15 between the feed bushing 76 and the outer pipe 62, a relative rotation takes place. A gap 80 substantially corresponding to the gap 80 in the central section 70, as depicted in FIG. 2, is embodied between the outer pipe 62 and the feed bushing 76. Lubricant is fed into the annular channel 63 between the outer and the inner pipe 62, 64 via the feed bushing 76 resulting in a flow of lubricant 19. Due to the fact that there is no relative rotation between the outer and the inner pipe 62, 64, a sealing ring 56 in the region of the second end 69 is substantially only subject to static pressure and hence suitable for withstanding increased feed pressure in the lubricant 19. Further, the gap 80 minimizes leakage losses (arrows 79) at the feed bushing 76. The inner pipe 64 is accommodated rotatably on the housing 12 or a housing lid 58 in a rolling-contact bearing 53. The rolling-contact bearing 53 is arranged in the region of the sealing ring 56 at the end of the outer pipe 62, i.e. substantially along the main axis of rotation 15, adjacent thereto. The rolling-contact bearing 53 offers a high degree of stability against displacement of the inner pipe 64 in the radial direction. Similarly, to FIG. 1, a radial inner outer direction and radial outer direction are symbolized in FIG. 4 by arrows 72, 74. This counteracts any change in the gap height 88 at the feed bushing 76 as a result of displacement due to manufacturing deviations and tolerances. This in turn has the result that leakage losses 79 at the feed bushing 76 are further minimized.

Figure 5:
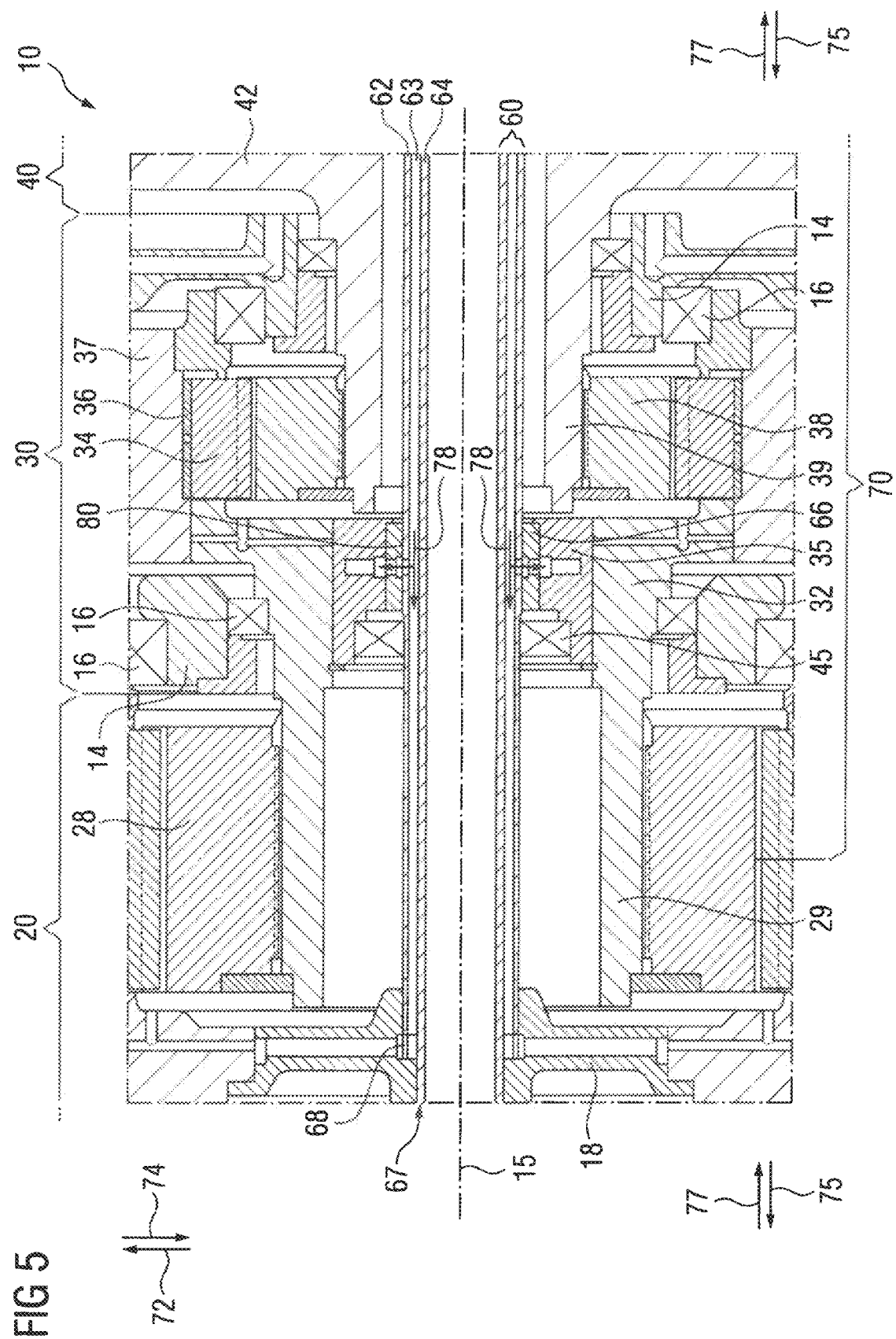
FIG. 5 is a schematic longitudinal section of a second embodiment of a planetary gearing according to the present invention, showing in detail a region of an outlet point of the planetary gearing.

FIG. 5 shows a schematic longitudinal section of a second embodiment of a planetary gearing 10 according to the present invention in the region of the second planetary stage 30. Parts corresponding with those in FIGS. 1 to 4 are denoted by identical reference numerals and not explained again. The description below will center on the differences between the embodiments. FIG. 5 shows the planetary gearing 10 in the region of a first end 67 of the double-walled pipe 60 and in the region of central section 70 thereof in which at least the second planetary stage 30 is located. Herein, the second planetary stage 30 is arranged along the main axis of rotation 15 of the planetary gearing 10 between the first and third planetary stage 20, 40. The first planetary stage 20 has a sun gear 28, which is connected to a sun shaft 29 in a torque-transmitting manner. The sun shaft 29 of the first planetary stage 20 is embodied in one piece with a planetary carrier 32 of the second planetary stage 30. The planetary carrier 32 of the second planetary stage 30 is mounted rotatably by means of land bearings 16 arranged on housing walls 14. Planetary gears 34, which are in turn attached to planetary gear bolts 37 are arranged rotatably on friction bearings 36 in the planetary carrier 32. The planetary gear bolts 37 are connected releasably to the planetary carrier 32 of the second planetary stage 30. The planetary gears 34 in turn mesh with a sun gear 38 of the second planetary stage 30, which is connected in a torque-transmitting manner to a sun shaft 39. The sun shaft 39 of the second planetary stage 30 in turn drives the third planetary stage 40.

The double-walled pipe 60 including an outer pipe 62 and an inner pipe 64 is arranged in the region of the main axis of rotation 15. The outer and inner pipes 62, 64 form an annular channel 63 through which a lubricant is conveyed. A lubricant flow, indicated by arrows 78, is established during operation as intended of the planetary gearing 10. A bushing 66 through which lubricant is guided from an opening at outer pipe 62 from the annular channel 63 into the second planetary stage 30 is arranged in the region of the second planetary stage 30. A gap 80 is embodied between the bushing 66 and the outer pipe 62 so that there is no direct contact between the outer pipe 62 and the bushing 66. The bushing 66 is arranged on a baseplate 35 of the planetary carrier 32 of the second planetary stage 30. Further, a guide bearing 45 is arranged in the region of the bushing 66, i.e. substantially axially adjacent, on the planetary carrier 32. The guide bearing 45 supports the outer pipe 62 with respect to the planetary carrier 32 in the radial direction. In FIG. 5, a radial outer direction is symbolized by the arrow 72, a radial inner direction by the arrow 74. The fact that the guide bearing 45 and the bushing 66 with the planetary carrier 32 of the second planetary stage 30 are supported on the same component and, in the axial direction, are substantially positioned in respect to one another, means that the outer pipe 62 is also held relative to the bushing 66 by the guide bearing 45. This counteracts radial distortion or deflection of the outer pipe 62 in the region of the bushing 66. Such radial distortion or deflection results in a change to the gap 80 between the outer pipe 62 and the bushing 66, in particular with respect to the gap height 88. This avoids excessive leakage losses at the bushing 66.

The guide bearing 45 can be embodied as a simple rolling-contact bearing, for example as a ball bearing. During operation as intended, the guide bearing 45 only follows a relative rotation between the planetary carrier 32 of the second planetary stage 30 and the double-walled pipe 60. Accordingly, the requirements for the guide bearing 45 in respect of service life in revolutions are low. Hence, the guide bearing 45 offers a simple possibility for using the bushing 66 in combination with the double-walled pipe 60 even in planetary gearings 10 in which increased displacement is to be expected in the region of the second planetary stage 30. Hence, the planetary gearing 10 according to FIG. 5 can be adapted to operate at high performance requirements in a simple manner. This is in particular applicable to planetary gearings 10 that are used in wind turbines.

Figure 6:
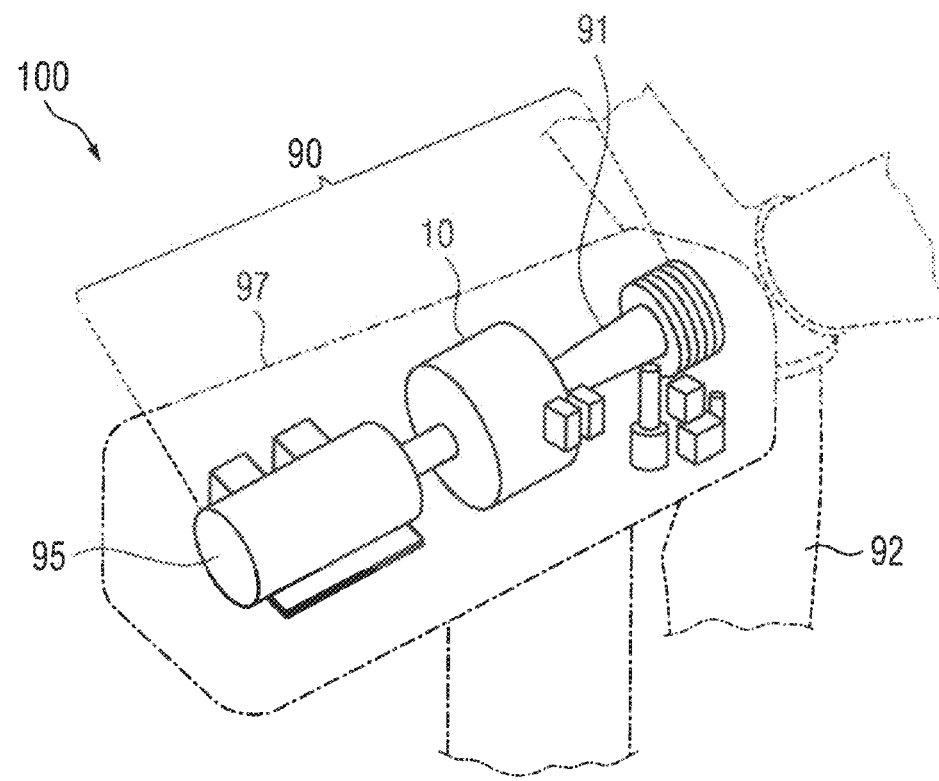
FIG. 6 is a cut oblique view of a wind turbine according to the present invention.

Turning now to FIG. 6 there is shown a cut oblique view of a wind turbine according to the present invention, generally designated by reference numeral 100. The wind turbine 100 has a rotor 92, which is attached rotatably on a nacelle 97. The rotor 92 is connected to a rotor shaft 91, which serves as input shaft 21 and by means of which a generator 95 is driven via a planetary gearing 10, as described above. The rotor shaft 91, the planetary gearing 10 and the generator 95 belong to a drive train 90 of the wind turbine 100, which is accommodated in the nacelle 97.

Figure 7:
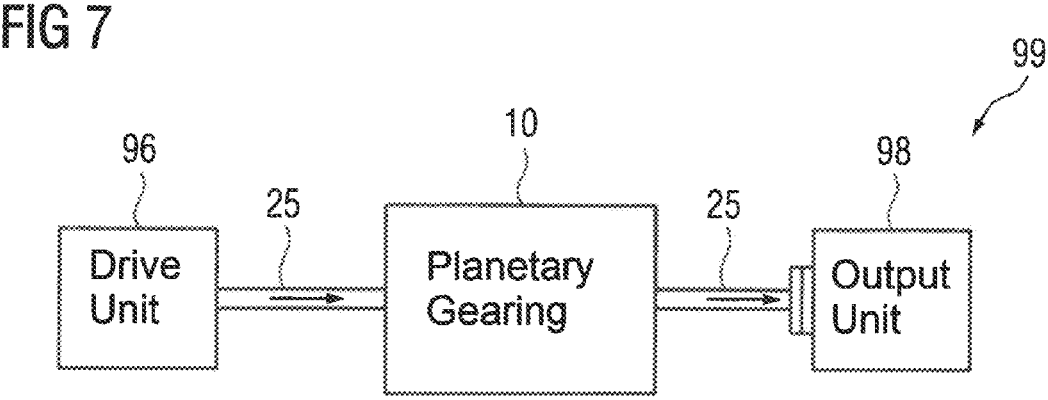
FIG. 7 is a schematic illustration of an industrial application according to the present invention.

FIG. 7 shows the schematic structure of an industrial application according to the present invention, generally designated by reference numeral 99. The industrial application has a drive unit 96 and an output unit 98, which are connected to one another in a torque-transmitting manner via a planetary gearing 10, as described above. The drive unit 96 is embodied to provide a drive power indicated by arrows 25 and required to operate the output unit 98. For this purpose, the drive unit 96 can be embodied as an electric motor, internal combustion engine or hydraulic motor. The output unit 98 is embodied as a mechanical application. Accordingly, the output unit 98 is embodied such that the industrial application 99 is for example a mill, vertical mill, sugar mill, cement mill, rock crusher, conveyor belt, pump, roller press, apron conveyor, tube mill, rotary kiln, slewing gear, agitator, lifting device, waste compactor or scrap baling press. The functions of input shaft 21 and the output shaft 55 can also be interchanged, as shown in FIG. 1.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A planetary gearing, comprising:
   a first planetary stage connected to an input shaft;
   a second planetary stage operably connected to the first planetary stage;
   a double-walled pipe sized to extend through the first and second planetary stages and coupled to the input shaft to follow a rotation of the input shaft, said double-walled pipe including an inner pipe, an outer pipe in surrounding relation to the inner pipe, a central section, and an outlet point embodied in the central section for output of lubricant, the double-walled pipe defining a gap in fluid communication with the outlet point to allow leakage of lubricant;
   a guide bearing arranged in a region of the outlet point and supporting the outer pipe and configured to adjust the gap; and
   a bushing arranged on the outlet point and configured to guide the lubricant output from the outlet point, with the bushing positioned axially adjacent to the guide bearing for limiting a displacement of the double-walled pipe in a region of the central section.

2. The planetary gearing of claim 1, wherein the first planetary stage includes at least five planetary gears and/or the second planetary stage includes at least four planetary gears.

3. The planetary gearing of claim 1, wherein the second planetary stage comprises a planetary carrier which includes a baseplate connected to the bushing, said bushing having a width which corresponds to a wall thickness of the baseplate of the planetary carrier.

4. The planetary gearing of claim 3, further comprising a bearing configured to accommodate axial and radial forces, said planetary carrier of the second planetary stage being accommodated in the bearing.

5. The planetary gearing of claim 1, further comprising a third planetary stage, said second planetary stage being arranged between the first and third planetary stages.

6. The planetary gearing of claim 1, wherein the double-walled pipe is configured to enable dismantling thereof without destruction.

7. The planetary gearing of claim 1, further comprising a further outlet point arranged in a region of a first end of the double-walled pipe.

8. The planetary gearing of claim 7, further comprising a feed bushing arranged on a second end of the double-walled pipe.

9. The planetary gearing of claim 1, wherein a gap height of the gap is between 0.1 mm and 0.5 mm.

10. The planetary gearing of claim 1, wherein a gap height of the gap is between 0.25 mm and 0.35 mm.

11. The planetary gearing of claim 1, wherein the bushing and the guide bearing are arranged on an inner hub of the planetary carrier of the second planetary stage.

12. A drive train for a wind turbine, said drive train comprising:
   a generator;
   a planetary gearing connected in a torque-transmitting manner to the generator, said planetary gearing including a first planetary stage connected to an input shaft, a second planetary stage operably connected to the first planetary stage, a double-walled pipe sized to extend through the first and second planetary stages and coupled to the input shaft to follow a rotation of the input shaft, said double-walled pipe including an inner pipe, an outer pipe in surrounding relation to the inner pipe, a central section, and an outlet point embodied in the central section for output of lubricant, the double-walled pipe defining a gap in fluid communication with the outlet point to allow leakage of lubricant, a guide bearing arranged in a region of the outlet point and supporting the outer pipe and configured to adjust the gap, and a bushing arranged on the outlet point and configured to guide the lubricant output from the outlet point, with the bushing positioned axially adjacent to the guide bearing for limiting a displacement of the double-walled pipe in a region of the central section; and a rotor shaft connected in a torque-transmitting manner to the planetary gearing.

13. A wind turbine, comprising:

a nacelle including a drive train as set forth in claim 12; and a rotor attached rotatably on the nacelle.

14. An industrial application, comprising:

a drive unit;

an output unit; and a planetary gearing connecting the drive unit and the output unit to one another in a torque-transmitting manner, said planetary gearing comprising a first planetary stage which includes an input shaft connected to the drive unit, a second planetary stage operably connected to the first planetary stage, a double-walled pipe sized to extend through the first and second planetary stages and coupled to the input shaft to follow a rotation of the input shaft, said double-walled pipe including an inner pipe, an outer pipe in surrounding relation to the inner pipe, a central section, and an outlet point embodied in the central section for output of lubricant, the double-walled pipe defining a gap in fluid communication with the outlet point to allow leakage of lubricant, a guide bearing arranged in a region of the outlet point and supporting the outer pipe and configured to adjust the gap, and a bushing arranged on the outlet point and configured to guide the lubricant output from the outlet point, with the bushing positioned axially adjacent to the guide bearing for limiting a displacement of the double-walled pipe in a region of the central section.

\* \* \* \* \*